US012787063B2

(12) United States Patent
Kim

(10) Patent No.: US 12,787,063 B2
(45) Date of Patent: Nov. 3, 2026

(54) METHOD AND DEVICE FOR TRANSMITTING AND RECEIVING RAPID DATA IN COMMUNICATION SYSTEM

(71) Applicants: HYUNDAI MOTOR COMPANY, Seoul (KR); KIA CORPORATION, Seoul (KR); Korea National University of Transportation Industry-Academic Cooperation Foundation, Chungju-si (KR)

(72) Inventor: Yong Ho Kim, Incheon (KR)

(73) Assignees: HYUNDAI MOTOR COMPANY, Seoul (KR); KIA CORPORATION, Seoul (KR); Korea National University of Transportation Industry-Academic Cooperation Foundation, Chungju-si (KR)

( * ) Notice: Subject to any disclaimer, the term of this patent is extended or adjusted under 35 U.S.C. 154(b) by 280 days.

(21) Appl. No.: 18/612,305

(22) Filed: Mar. 21, 2024

(65) Prior Publication Data

US 2024/0237070 A1 Jul. 11, 2024

Related U.S. Application Data

(63) Continuation-in-part of application No. PCT/KR2022/014292, filed on Sep. 23, 2022.

(30) Foreign Application Priority Data

Sep. 24, 2021 (KR) ........................ 10-2021-0126766

(51) Int. Cl.

| | |
|---|---|
| *H04W 74/0816* | (2024.01) |
| *H04L 1/00* | (2006.01) |
| *H04W 74/08* | (2024.01) |

(52) U.S. Cl.

CPC ....... *H04W 74/0816* (2013.01); *H04L 1/0008* (2013.01); *H04W 74/0866* (2013.01)

(58) Field of Classification Search

None

See application file for complete search history.

(56) References Cited

U.S. PATENT DOCUMENTS

| | | | | |
|---|---|---|---|---|
| 12,641,646 B2 * | 5/2026 | Lu | ..................... | H04W 28/0861 |
| 2017/0280450 A1 * | 9/2017 | Jeong | ................ | H04W 72/0446 |

(Continued)

FOREIGN PATENT DOCUMENTS

| | | |
|---|---|---|
| EP | 3579467 A1 | 12/2019 |
| KR | 10-2021-0018990 A | 2/2021 |
| WO | 2017/026807 A1 | 2/2017 |

OTHER PUBLICATIONS

Bo Yang Boyce et al., "Discussion on low latency traffic", doc.: IEEE 802.11-20-1852/r2, Nov. 2, 2020.

(Continued)

*Primary Examiner* — Phirin Sam

(74) *Attorney, Agent, or Firm* — Morgan, Lewis & Bockius LLP

(57) ABSTRACT

In a method and device for transmitting and receiving rapid data in a communication system, an AP method includes the steps of: setting a first TS for a first STA; setting a second TS for a second STA; transmitting a first data frame of the first STA in the first TS; and transmitting a second data frame of the second STA in a transmission interval including the second TS, wherein the first TS and the second TS are sequentially set in an rTWT SP.

18 Claims, 13 Drawing Sheets

(56) References Cited

U.S. PATENT DOCUMENTS

| | | | | |
|---|---|---|---|---|
| 2018/0213481 | A1* | 7/2018 | Merlin | H04W 52/0235 |
| 2018/0295573 | A1 | 10/2018 | Gidvani et al. | |
| 2019/0124654 | A1* | 4/2019 | Cherian | H04L 1/1657 |
| 2021/0022154 | A1 | 1/2021 | Cavalcanti et al. | |
| 2021/0321243 | A1* | 10/2021 | Patil | H04W 8/005 |
| 2022/0141680 | A1* | 5/2022 | Min | H04W 28/02 |
| 2022/0182935 | A1* | 6/2022 | Hu | H04W 52/0248 |
| 2023/0047705 | A1* | 2/2023 | Xin | H04W 52/0216 |
| 2023/0058871 | A1* | 2/2023 | Xin | H04W 52/0258 |
| 2023/0104446 | A1* | 4/2023 | Ajami | H04W 74/0808 370/329 |
| 2024/0137978 | A1* | 4/2024 | Ajami | H04W 74/0808 |
| 2024/0163916 | A1* | 5/2024 | Ryu | H04W 74/0866 |
| 2025/0240729 | A1* | 7/2025 | Bang | H04W 72/04 |

OTHER PUBLICATIONS

International Search Report dated Jan. 2, 2023 cited in International Patent Application No. PCT/KR2022/014292 (w/English translation).

R. Shafin, et al., "Handling Fairness Issue in Restricted TWT," IEE 802.11-21/1020r0, Jun. 25, 2021.

C. Hu, et al., "Traffic Prioritization During the Restricted TWT SPs," IEE 802.11-21/1115r1, Jul. 25, 2021.

* cited by examiner

METHOD AND DEVICE FOR TRANSMITTING AND RECEIVING RAPID DATA IN COMMUNICATION SYSTEM

CROSS-REFERENCE TO RELATED APPLICATION

The present application is a continuation-in-part of currently pending International Patent Application No. PCT/KR2022/014292, filed Sep. 23, 2022, which claims priority to Korean Patent Application Number 10-2021-0126766, filed Sep. 24, 2021, the entire contents of which are incorporated herein for all purposes by these references.

BACKGROUND OF THE PRESENT DISCLOSURE

Field of the Present Disclosure

The present disclosure relates to a wireless local area network (LAN) communication technique, and more particularly, to a technique for rapidly transmitting time-sensitive data.

DESCRIPTION OF RELATED ART

Recently, as the spread of mobile devices expands, a wireless local area network technology capable of providing fast wireless communication services to mobile devices is in the spotlight. The wireless LAN technology may be a technology that supports mobile devices such as smart phones, smart pads, laptop computers, portable multimedia players, embedded devices, and the like to wirelessly access the Internet based on wireless communication technology.

As applications requiring higher throughput and applications requiring real-time transmission occur, the IEEE 802.11be standard, which is an extreme high throughput (EHT) wireless LAN technology, is being developed. The goal of the IEEE 802.11be standard may be to support a high throughput of 30 Gbps. The IEEE 802.11be standard may support techniques for reducing a transmission latency. In addition, the IEEE 802.11be standard can support a more expanded frequency bandwidth (e.g. 320 MHz bandwidth), multi-link transmission and aggregation operations including multi-band operations, multiple access point (AP) transmission operations, and/or efficient retransmission operations (e.g. hybrid automatic repeat request (HARQ) operations).

Improvements to the conventional Carrier Sensing Multiple Access/Collision Avoidance (CSMA) scheme may be required for low-latency operations in a wireless LAN. To transmit data based on the CSMA scheme, a communication node may check whether a channel is in an idle state by performing a channel access procedure. When the channel is in an idle state, the communication node may transmit data. That is, the communication node may compete with other communication nodes to transmit data. Since it takes a time due to the competition, there may be limitations in quickly transmitting data.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

The present disclosure is directed to providing a method and an apparatus for rapidly transmitting time-sensitive data in a communication system.

A method of an access point (AP), according to various exemplary embodiments of the present disclosure for achieving the above-described objective, may include: configuring a first time slot (TS) for a first station (STA); configuring a second TS for a second STA; transmitting a first data frame for the first STA in the first TS; and transmitting a second data frame for the second STA in a transmission period including the second TS, wherein the first TS and the second TS are sequentially configured within a restricted target wake time (rTWT) service period (SP).

The configuring of the first TS for the first STA may include: receiving a TWT setup request frame from the first STA; and transmitting a TWT setup response frame to the first STA in response to the TWT setup request frame, wherein at least one of the TWT setup request frame or the TWT setup response frame includes offset information and duration information of the first TS, and the offset information indicates an offset from a start time of the rTWT SP to a start time of the first TS.

x bits in a nominal minimum TWT wake duration included in the TWT setup request frame or the TWT setup response frame may indicate the offset information, y bits in the nominal minimum TWT wake duration may indicate the duration information, and x and y are each natural numbers.

Each of the first data frame and the second data frame may be transmitted after a channel access procedure succeeds.

A transmission procedure of the second data frame may start after a time of (a transmission time of the first data frame+short interframe space (SIFS)+a reception time of a reception response frame+SIFS) elapses.

Padding may be added to the first data frame so that a transmission procedure of the second data frame starts after a start time of the second TS.

A header of the first data frame may include information indicating to add padding to a reception response frame for the first data frame.

A method of a station (STA), according to various exemplary embodiments of the present disclosure for achieving the above-described objective, may include: transmitting a target wake time (TWT) setup request frame to an access point (AP); receiving a TWT setup response frame from the AP in response to the TWT setup request frame; and receiving a data frame from the AP within a time slot (TS) configured by exchanging the TWT setup request frame and the TWT setup response frame, wherein the TS is configured within a restricted TWT (rTWT) service period (SP).

At least one of the TWT setup request frame or the TWT setup response frame may include offset information and duration information of the TS, and the offset information may indicate an offset from a start time of the rTWT SP to a start time of the TS.

x bits in a nominal minimum TWT wake duration included in the TWT setup request frame or the TWT setup response frame may indicate the offset information, y bits in the nominal minimum TWT wake duration may indicate the duration information, and x and y are each natural numbers.

The method may further include: transmitting a reception response frame for the data frame to the AP, wherein when a header of the data frame includes information indicating to add padding to the reception response frame for the data frame, the padding may be added to the reception response frame.

An access point (AP), according to various exemplary embodiments of the present disclosure for achieving the above-described objective, may include: a processor; and a memory storing one or more instructions executable by the processor, wherein the one or more instructions may be executed to perform: configuring a first time slot (TS) for a first station (STA); configuring a second TS for a second STA; transmitting a first data frame for the first STA in the first TS; and transmitting a second data frame for the second STA in a transmission period including the second TS, wherein the first TS and the second TS are sequentially configured within a restricted target wake time (rTWT) service period (SP).

In the configuring of the first TS for the first STA, the one or more instructions may be further executed to perform: receiving a TWT setup request frame from the first STA; and transmitting a TWT setup response frame to the first STA in response to the TWT setup request frame, wherein at least one of the TWT setup request frame or the TWT setup response frame may include offset information and duration information of the first TS, and the offset information may indicate an offset from a start time of the rTWT SP to a start time of the first TS.

x bits in a nominal minimum TWT wake duration included in the TWT setup request frame or the TWT setup response frame may indicate the offset information, y bits in the nominal minimum TWT wake duration may indicate the duration information, and x and y are each natural numbers.

Each of the first data frame and the second data frame may be transmitted after a channel access procedure succeeds.

A transmission procedure of the second data frame may start after a time of (a transmission time of the first data frame+short interframe space (SIFS)+a reception time of a reception response frame+SIFS) elapses.

Padding may be added to the first data frame so that a transmission procedure of the second data frame starts after a start time of the second TS.

A header of the first data frame may include information indicating to add padding to a reception response frame for the first data frame.

According to an exemplary embodiment of the present disclosure, a plurality of transmission periods may be configured, and a first communication node can quickly transmit data (e.g. time-sensitive data) in each of the plurality of transmission period. A second communication node may receive data in its own transmission period among the plurality of transmission periods. That is, since the data can be transmitted and received in a preconfigured time, a delay may not occur in transmission of the data. Accordingly, the performance of the communication system can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
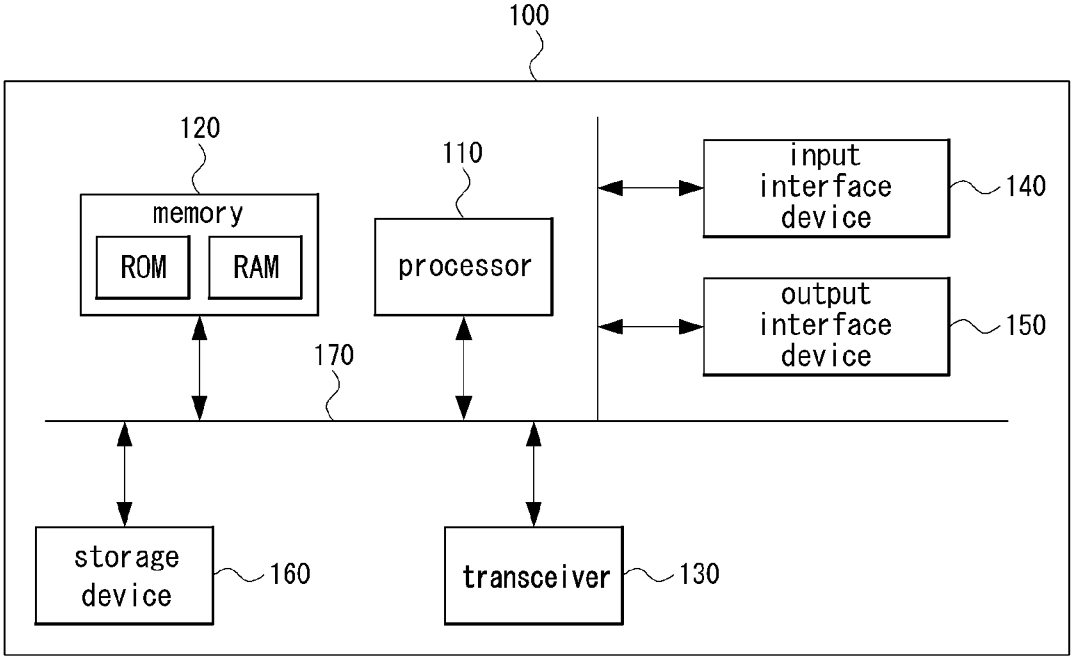
FIG. 1 is a block diagram illustrating various exemplary embodiments of a communication node constituting a wireless LAN system.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present disclosure, it will be understood that the present description is not intended to limit the invention(s) to those exemplary embodiments. On the contrary, the invention(s) is/are intended to cover not only the exemplary embodiments of the present disclosure, but also various alternatives, modifications, equivalents and other embodiments, which may be included within the spirit and scope of the invention as defined by the appended claims.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the present disclosure, to facilitate the entire understanding of the present disclosure, like numbers refer to like elements throughout the description of the figures and the repetitive description thereof will be omitted.

In the following, a wireless communication system to which exemplary embodiments according to an exemplary embodiment of the present disclosure are applied will be described. The wireless communication system to which the exemplary embodiments according to an exemplary embodiment of the present disclosure are applied is not limited to the contents described below, and the exemplary embodiments according to an exemplary embodiment of the present disclosure can be applied to various wireless communication systems. A wireless communication system may be referred to as a 'wireless communication network'.

In exemplary embodiments, 'configuration of an operation (e.g. transmission operation)' may mean that 'configuration information (e.g. information element(s), parameter (s)) for the operation' and/or 'information indicating to perform the operation' is signaled. 'Configuration of an information element (e.g. parameter)' may mean that the information element is signaled. 'Configuration of a resource (e.g. resource region)' may mean that setting information of the resource is signaled.

FIG. 1 is a block diagram illustrating a first exemplary embodiment of a communication node constituting a wireless LAN system.

As shown in FIG. 1, a communication node 100 may be an access point, a station, an access point (AP) multi-link device (MLD), or a non-AP MLD. An access point may refer to 'AP', and a station may refer to 'STA' or 'non-AP STA'. An operating channel width supported by an AP may be 20 megahertz (MHz), 80 MHz, 160 MHz, or the like. An operating channel width supported by a STA may be 20 MHz, 80 MHz, or the like.

The communication node 100 may include at least one processor 110, a memory 120, and a transceiver 130 connected to a network to perform communications. The transceiver 130 may be referred to as a transceiver, a radio frequency (RF) unit, an RF module, or the like. In addition, the communication node 100 may further include an input interface device 140, an output interface device 150, a storage device 160, and the like. The respective components included in the communication node 100 may be connected by a bus 170 to communicate with each other.

However, the respective components included in the communication node 100 may be connected through individual interfaces or individual buses centering on the processor 110 instead of the common bus 170. For example, the processor 110 may be connected to at least one of the memory 120, the transceiver 130, the input interface device 140, the output interface device 150, and the storage device 160 through a dedicated interface.

The processor 110 may execute program commands stored in at least one of the memory 120 and the storage device 160. The processor 110 may refer to a central processing unit (CPU), a graphics processing unit (GPU), or a dedicated processor on which the methods according to the exemplary embodiments of the present invention are performed. Each of the memory 120 and the storage device 160 may be configured as at least one of a volatile storage medium and a nonvolatile storage medium. For example, the memory 120 may be configured with at least one of a read only memory (ROM) and a random access memory (RAM).

Figure 2:
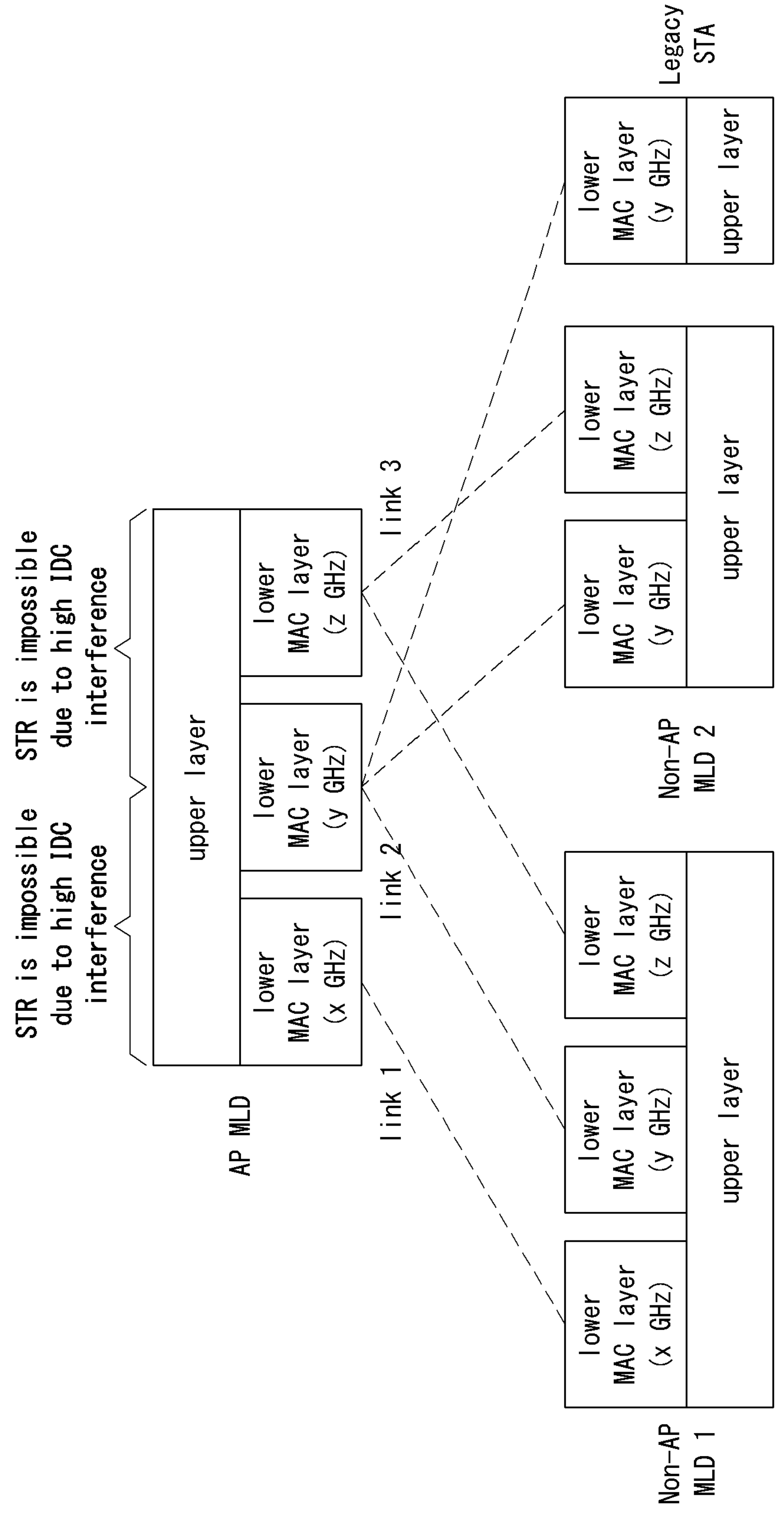
FIG. 2 is a conceptual diagram illustrating various exemplary embodiments of a multi-link configured between multi-link devices (MLDs).

FIG. 2 is a conceptual diagram illustrating a first exemplary embodiment of a multi-link configured between multilink devices (MLDs).

As shown in FIG. 2, an MLD may have one medium access control (MAC) address. In exemplary embodiments, the MLD may mean an AP MLD and/or non-AP MLD. The MAC address of the MLD may be used in a multi-link setup procedure between the non-AP MLD and the AP MLD. The MAC address of the AP MLD may be different from the MAC address of the non-AP MLD. AP(s) affiliated with the AP MLD may have different MAC addresses, and station(s) affiliated with the non-AP MLD may have different MAC addresses. Each of the APs having different MAC addresses within the AP MLD may be in charge of each link, and may perform a role of an independent AP.

Each of the STAs having different MAC addresses within the non-AP MLD may be in charge of each link, and may perform a role of an independent STA. The non-AP MLD may be referred to as a STA MLD. The MLD may support a simultaneous transmit and receive (STR) operation. In the instant case, the MLD may perform a transmission operation in a link 1 and may perform a reception operation in a link 2. The MLD supporting the STR operation may be referred to as an STR MLD (e.g. STR AP MLD, STR non-AP MLD). In exemplary embodiments of the present disclosure, a link may mean a channel or a band. A device that does not support the STR operation may be referred to as a non-STR (NSTR) AP MLD or an NSTR non-AP MLD (or NSTR STA MLD).

The MLD may transmit and receive frames in multiple links by using a non-contiguous bandwidth extension scheme (e.g. 80 MHz+80 MHz). The multi-link operation may include multi-band transmission. The AP MLD may include a plurality of APs, and the plurality of APs may operate in different links. Each of the plurality of APs may perform function(s) of a lower MAC layer. Each of the plurality of APs may be referred to as a 'communication node' or 'lower entity'. The communication node (i.e., AP) may operate under control of an upper layer (or the processor 110 shown in FIG. 1). The non-AP MLD may include a plurality of STAs, and the plurality of STAs may operate in different links. Each of the plurality of STAs may be referred to as a 'communication node' or 'lower entity'. The communication node (i.e., STA) may operate under control of an upper layer (or the processor 110 shown in FIG. 1).

The MLD may perform communications in multiple bands (i.e., multi-band). For example, the MLD may perform communications using an 80 MHz bandwidth according to a channel expansion scheme (e.g. bandwidth expansion scheme) in a 2.4 GHz band, and perform communications using a 160 MHz bandwidth according to a channel expansion scheme in a 5 GHz band. The MLD may perform communications using a 160 MHz bandwidth in the 5 GHz band, and may perform communications using a 160 MHz bandwidth in a 6 GHz band. One frequency band (e.g. one channel) used by the MLD may be defined as one link. Alternatively, a plurality of links may be configured in one frequency band used by the MLD. For example, the MLD may configure one link in the 2.4 GHz band and two links in the 6 GHz band. The respective links may be referred to as a first link, a second link, and a third link. Alternatively, each link may be referred to as a link 1, a link 2, a link 3, or the like. A link number may be set by an access point, and an identifier (ID) may be assigned to each link.

The MLD (e.g. AP MLD and/or non-AP MLD) may configure a multi-link by performing an access procedure and/or a negotiation procedure for a multi-link operation. In the instant case, the number of links and/or link(s) to be used in the multi-link may be configured. The non-AP MLD (e.g. STA) may identify information on band(s) capable of communicating with the AP MLD. In the negotiation procedure for a multi-link operation between the non-AP MLD and the AP MLD, the non-AP MLD may configure one or more links among links supported by the AP MLD to be used for the multi-link operation. A station that does not support a multi-link operation (e.g. IEEE 802.11a/b/g/n/ac/ax STA) may be connected to one or more links of the multi-link supported by the AP MLD.

When a band separation between multiple links (e.g. a band separation between a link 1 and a link 2 in the frequency domain) is sufficient, the MLD may be able to perform an STR operation. For example, the MLD may transmit a physical layer convergence procedure (PLCP) protocol data unit (PPDU) 1 using the link 1 among multiple links, and may receive a PPDU 2 using the link 2 among multiple links. On the other hand, if the MLD performs an STR operation when the band separation between multiple links is not sufficient, in-device coexistence (IDC) interference, which is interference between the multiple links, may occur. Accordingly, when the bandwidth separation between multiple links is not sufficient, the MLD may not be able to perform an STR operation. A link pair having the above-described interference relationship may be a non-simultaneous transmit and receive (NSTR)-limited link pair. Here, the MLD may be referred to as 'NSTR AP MLD' or 'NSTR non-AP MLD'.

For example, a multi-link including a link 1, a link 2, and a link 3 may be configured between an AP MLD and a non-AP MLD 1. When a band separation between the link 1 and the link 3 is sufficient, the AP MLD may perform an STR operation using the link 1 and the link 3. That is, the AP MLD may transmit a frame using the link 1 and receive a frame using the link 3. When a band separation between the link 1 and the link 2 is insufficient, the AP MLD may not be able to perform an STR operation using the link 1 and the link 2. When a band separation between the link 2 and the link 3 is not sufficient, the AP MLD may not be able to perform an STR operation using the link 2 and the link 3.

Meanwhile, in a wireless LAN system, a negotiation procedure for a multi-link operation may be performed in an access procedure between a station and an access point.

A device (e.g. access point, station) that supports multiple links may be referred to as 'multi-link device (MLD)'. An access point supporting multiple links may be referred to as 'AP MLD', and a station supporting multiple links may be referred to as 'non-AP MLD' or 'STA MLD'. The AP MLD may have a physical address (e.g. MAC address) for each link. The AP MLD may be implemented as if an AP in charge of each link exists separately. A plurality of APs may be managed within one AP MLD. Therefore, coordination between a plurality of APs belonging to the same AP MLD may be possible. A STA MLD may have a physical address (e.g. MAC address) for each link. The STA MLD may be implemented as if a STA in charge of each link exists separately. A plurality of STAs may be managed within one STA MLD. Therefore, coordination between a plurality of STAs belonging to the same STA MLD may be possible.

For example, an AP1 of the AP MLD and a STA1 of the STA MLD may each be responsible for a first link and perform communication using the first link. An AP2 of the AP MLD and a STA2 of the STA MLD may each be responsible for a second link and perform communication using the second link. The STA2 may receive status change information for the first link on the second link. In the instant case, the STA MLD may collect information (e.g. status change information) received on the respective links, and control operations performed by the STA1 based on the collected information.

Hereinafter, data transmission and reception methods in a wireless LAN system will be described. Even when a method (e.g. transmission or reception of a signal) performed at a first communication node among communication nodes is described, a corresponding second communication node may perform a method (e.g. reception or transmission of the signal) corresponding to the method performed at the first communication node. That is, when an operation of a STA is described, an AP corresponding thereto may perform an operation corresponding to the operation of the STA. Conversely, when an operation of an AP is described, a STA corresponding thereto may perform an operation corresponding to the operation of the AP. In exemplary embodiments, an operation of a STA may be interpreted as an operation of a STA MLD, an operation of a STA MLD may be interpreted as an operation of a STA, an operation of an AP may be interpreted as an operation of an AP MLD, and an operation of an AP MLD may be interpreted as an operation of an AP.

Figure 3:
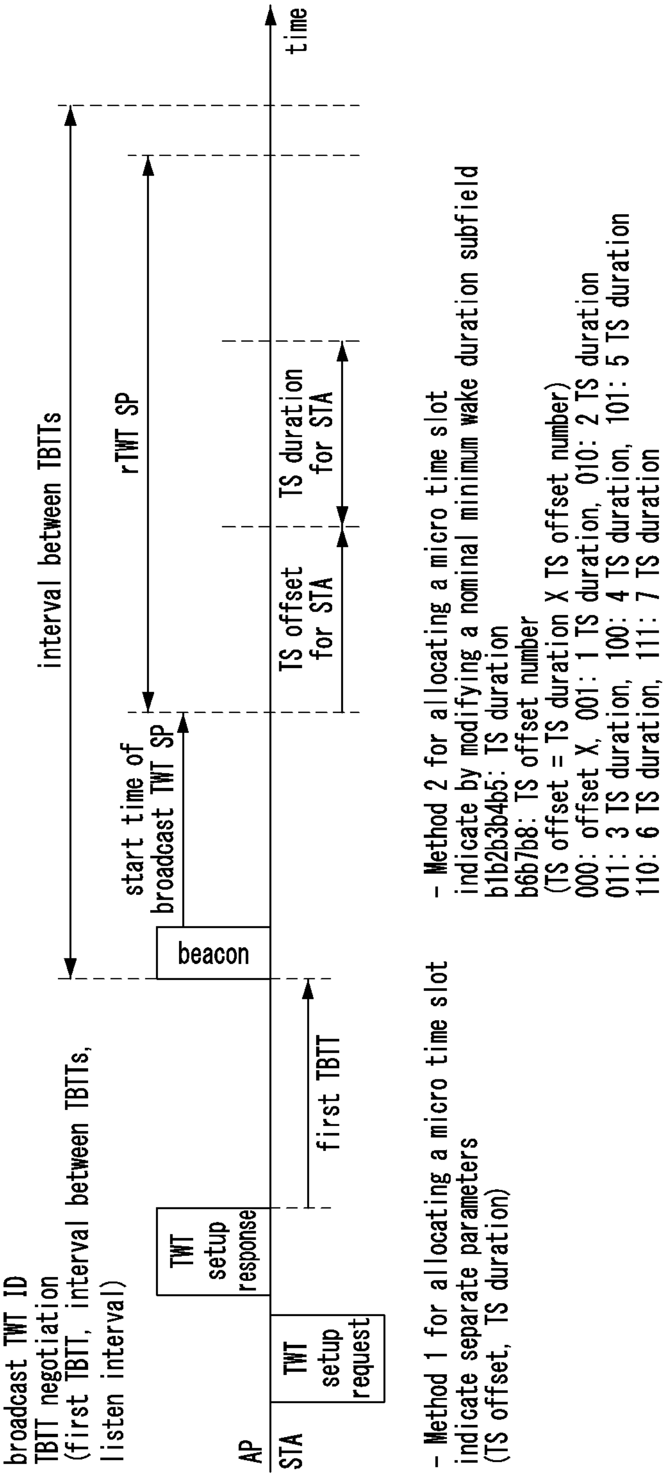
FIG. 3 is a timing diagram illustrating various exemplary embodiments of a slot allocation method for a slot-based restricted target wake time (rTWT).

FIG. 3 is a timing diagram illustrating a first exemplary embodiment of a slot allocation method for a slot-based restricted target wake time (rTWT).

As shown in FIG. 3, a STA may transmit a TWT setup request frame to an AP to negotiate a restricted TWT (rTWT). The AP may receive the TWT setup request frame from the STA. The AP may generate a TWT setup response frame including parameters to be used by the STA, and transmit the TWT setup response frame to the STA. The STA may receive the TWT setup response frame from the AP. The rTWT may be configured by exchanging the TWT setup request frame and the TWT setup response frame. The TWT setup request frame and TWT setup response frame may be action frames. The rTWT may be configured according to a broadcast TWT setup procedure. When the broadcast TWT setup procedure is performed, an ID of the rTWT may be assigned to the STA.

In addition, when the broadcast TWT setup procedure is performed, the STA may identify a target beacon transmission time (TBTT, e.g. wake TBTT), which is a time of transmitting a beacon frame including information on a rTWT service period (SP), and a transmission interval between TBTTs of the beacon frame including the information on the rTWT SP. That is, the STA may identify a time of transmitting the beacon frame including the rTWT SP information by performing the broadcast TWT setup procedure. The AP may transmit the beacon frame including the rTWT SP information at regular intervals. That is, the beacon frame including the rTWT SP information may be transmitted according to a specific periodicity. The beacon frame including the rTWT SP information may include information on the SP which is a period in which the rTWT operates. The information on the SP may indicate information on a time (e.g. start time, end time, and/or duration) of the SP located after the currently transmitted beacon frame. The beacon frame may include information on one or more SPs.

The STA may identify the time of transmitting the beacon frame including the rTWT SP information through the TBTT obtained through the broadcast TWT setup procedure, may receive the beacon frame from the AP at the corresponding time, and may identify the rTWT SP information included in the beacon frame. The beacon frame may include information on a start time and a duration of an SP identified by a rTWT ID. The STA may obtain information on the SP of the rTWT to which the STA belongs based on the rTWT ID obtained through the previous broadcast TWT setup procedure.

In the broadcast TWT setup procedure, a time slot (TS) belonging to the SP may be allocated to the STA. The broadcast TWT setup procedure may include a procedure for exchanging the TWT setup request frame and the TWT setup response frame. The STA may receive data in a TS allocated to itself. That is, the STA may receive data until the TS. The TS may operate as a target time until which the data should be received. The TS may be allocated based on two methods. In the first method, a TS offset subfield and a TS duration subfield of a TWT element included in the TWT setup request frame and/or TWT setup response frame may be used to allocate the TS. In the second method, a nominal minimum TWT wake duration subfield of the TWT element included in the TWT setup request frame and/or TWT setup response frame may be interpreted as a TS offset and a TS duration, and the TS may be allocated based on the above-described interpretation. The size of the nominal minimum TWT wake duration subfield may be 8 bits.

The STA may receive a physical layer protocol data unit (PPDU) in a period including the allocated TS within the rTWT SP. Transmission of the PPDU may start before or after a start time of the TS allocated to the STA, but the PPDU transmitted in the TS may include a MAC layer protocol data unit (MPDU) for the STA to which the TS is allocated. Since a PPDU transmitted outside of the TS allocated to the STA does not include a MPDU of the corresponding STA, the STA may not decode the PPDU outside of the TS. In an exemplary embodiment of the present disclosure, a PPDU may mean a data frame.

Figure 4:
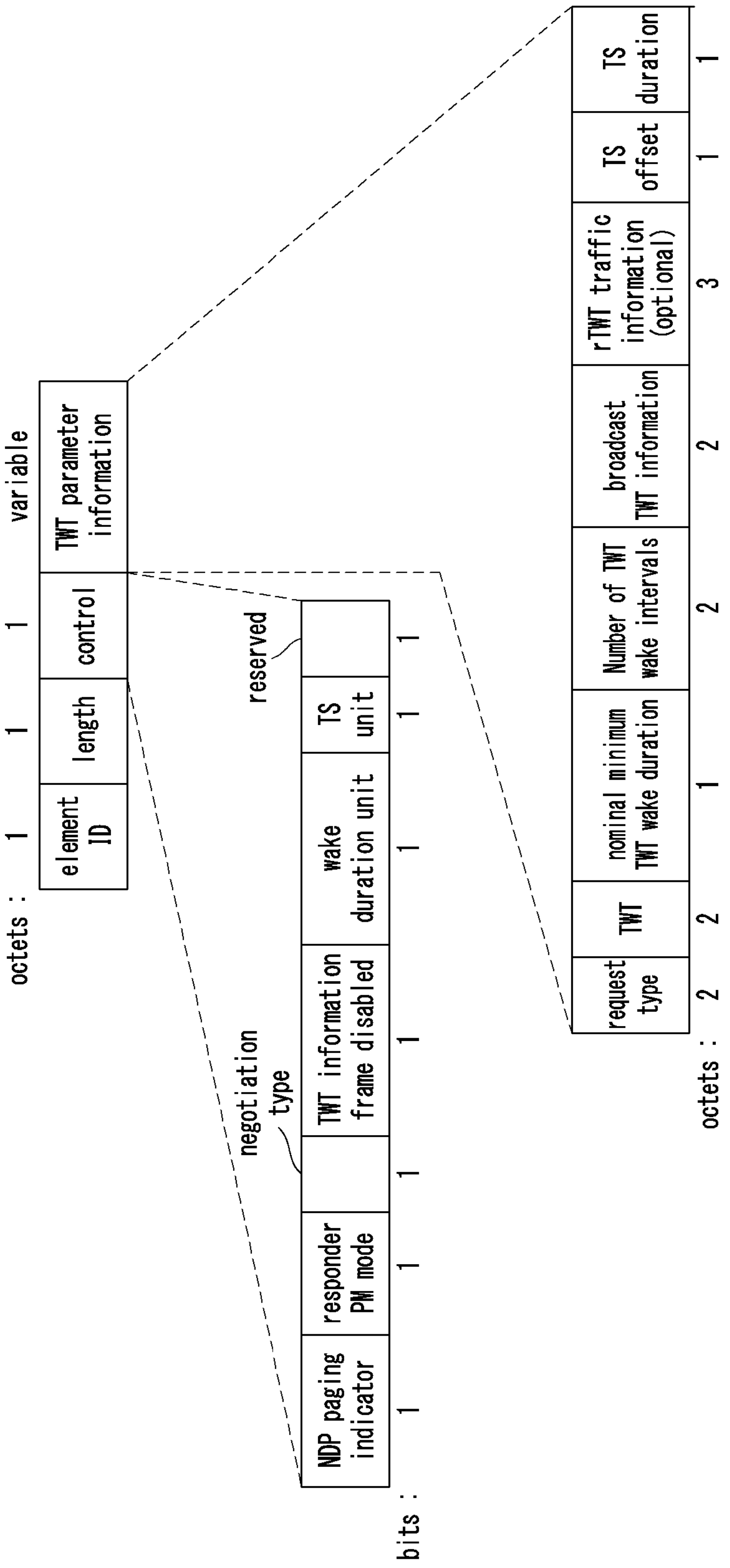
FIG. 4 is a conceptual diagram illustrating various exemplary embodiments of a frame format for negotiating parameters of a slot-based rTWT.

FIG. 4 is a conceptual diagram illustrating a first exemplary embodiment of a frame format for negotiating parameters of a slot-based rTWT.

As shown in FIG. 4, a frame may include a TWT element, and the TWT element may include element ID, length, control, and TWT parameter information fields. Each of the TWT setup request frame and TWT setup response frame may have a frame format shown in FIG. 4. A negotiation type 1 included in the control field of the TWT element may be a type that negotiates an interval between the next wake TBTT and the wake TBTT of the broadcast TWT. A 'TWT information frame disabled' field set by the STA may indicate that reception of a TWT information frame is released by the STA. If the AP sets the 'TWT information frame disabled' to 1, this may indicate that information on a time slot for a slot-based rTWT is included. If a NDP paging indicator is set to 1 in the TWT setup request frame and TWT setup response frame transmitted and received for TWT setup, this may indicate rTWT setup.

If the AP sets the NDP paging indicator to 1, one bit following a wake duration unit may be interpreted as a TS unit to indicate information on a TS of the rTWT. A TS duration unit indicated by the NDP paging indicator, wake duration unit, and TS unit may be as shown in Table 1 below.

TABLE 1

| TWT information frame disabled | Wake duration unit | TS unit | TS duration unit |
|---|---|---|---|
| 1 | 0 | 0 | 128 us |
| 1 | 0 | 1 | 256 us |
| 1 | 1 | 0 | 640 us |
| 1 | 1 | 1 | 1024 us |
| 0 | 0 | N/A | 256 us |
| 0 | 1 | N/A | 1024 us |

If the NDP paging indicator in the TWT setup response frame transmitted by the AP is set to 0, the TWT setup may be a setup of parameters for a normal TWT, and thus the TS unit is meaningless. Therefore, if the wake duration unit is 0, the TS duration unit may indicate 256 us. If the wake duration unit is 1, the TS duration unit may indicate 1024 us, which is one Transmission Unit (TU).

The AP may allocate the TS to the STA based on two methods. In the first method, the TWT element included in the TWT setup request frame and/or TWT setup response frame may include a TS offset subfield and a TS duration subfield, and the TS may be allocated using the TS offset subfield and the TS duration subfield. In the second method, the nominal minimum TWT wake duration subfield of the TWT element included in the TWT setup request frame and/or TWT setup response frame may be interpreted as a TS offset and a TS duration, and based on the above-described interpretation, the TS may be allocated.

In the first method, the TS offset subfield may indicate an offset from a start time of the SP (e.g. rTWT SP) to a start time of the TS, and the offset may be expressed in units indicated as the TS duration unit. The TS duration subfield may indicate a duration from the start time of the TS, and the duration may be expressed in units indicated as the TS duration unit. For example, when the TS duration unit is 128 us, the TS offset is 4, and the TS duration is 2, the start time of the TS may be 4×128 us after the start time of the SP, and the duration of the TS may be 2×128 us.

In the second method, the first x bits of the nominal minimum TWT wake duration subfield may be interpreted as the TS duration, and the remaining y bits of the nominal minimum TWT wake duration subfield may be interpreted as the TS offset. X may be 5, and y may be 3. When the second method is used, to indicate the TS offset, the lengths of TSs allocated to STAs belonging to the rTWT SP may be the same length indicated by the TS duration. Alternatively, a TS duration that is an integer multiple of the shortest TS duration among TSs allocated to STAs belonging to the rTWT SP may be used. For example, when the TS duration unit is 128 us, a TS duration assigned to a STA1 is 1, a TS offset assigned to the STA1 is 0, a TS duration assigned to a STA2 is 1, a TS offset assigned to the STA2 is 2, a TS duration assigned to a STA3 is 1, and a TS offset assigned to the STA3 is 1, a TS with a length of 128 us from the start time of the SP (i.e. a time corresponding to a TS offset of 0) may be allocated to the STA1, a TS with a length of 128 us after the TS offset (i.e. 1×128 us) from the start time of the SP may be allocated to the STA3, and a TS with a length of 128 us after the TS offset (i.e. 2×128 us) from the start time of the SP may be allocated to the STA2.

Figure 5:
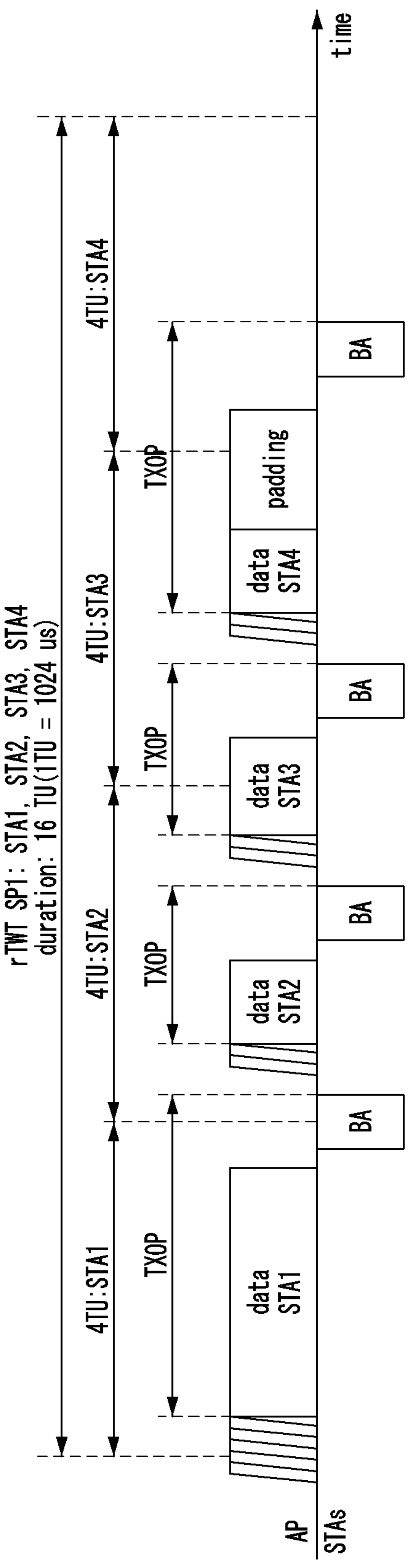
FIG. 5 is a timing diagram illustrating various exemplary embodiments of a communication method according to a slot-based rTWT.

FIG. 5 is a timing diagram illustrating a first exemplary embodiment of a communication method according to a slot-based rTWT.

As shown in FIG. 5, resources for a STA1, STA2, STA3, and STA4 may be allocated within a rTWT SP1. A duration of the rTWT SP1 may be 16 TUs (16384 us). A TS duration of 4 TUs (4096 us) may be set for each of the STA1, STA2, STA3, and STA4. A TS offset for the STA1 may be 0, a TS offset for the STA2 may be 4 TUs, a TS offset for the STA3 may be 8 TUs, and a TS offset for the STA4 may be 12 TUs. Accordingly, from a start time of the rTWT SP, TSs each having a length of 4 TUs may be be sequentially allocated to the STA1, STA2, STA3, and STA4. Each TS of the STA1, STA2, STA3, and STA4 may be configured by a procedure of exchanging the TWT setup request frame and TWT setup response frame shown in FIG. 3.

Each STA may obtain data by performing a decoding operation on a PPDU in the TS allocated to itself. The AP may perform a channel access procedure, a channel sensing procedure, and a backoff procedure to transmit a data frame. If the channel access procedure succeeds, since the first TS is a transmission period allocated to the STA1, the AP may transmit a data frame for the STA1 in the first TS. A transmit opportunity (TXOP) duration configured as the channel access procedure succeeds may fall within a TXOP limit and may include the first TS. The TXOP limit may be vary according to each TXOP limit AC. The maximum TXOP limit may be 4 TUs (4096 us). Since the TS duration assigned to each STA is 4 TUs, the TXOP duration configurable as the channel access procedure succeeds may be set to a value within the maximum TXOP limit (e.g. 4 TUs). The STA1 may receive a PPDU in the TS allocated to itself and obtain data by performing a decoding operation on the PPDU.

The AP may perform a channel access procedure to transmit a second data frame to the STA2 after transmitting the first data frame to the STA1 in the first TS. If the channel access procedure succeeds, the AP may transmit the second data frame to the STA2. The second data frame may be transmitted in the second TS within the rTWT SP. The STA2 may receive a PPDU in the TS allocated to itself and obtain data by performing a decoding operation on the PPDU.

The AP may perform a channel access procedure to transmit a third data frame to the STA3 after transmitting the second data frame to the STA2 in the second TS. If the channel access procedure succeeds, the AP may transmit the third data frame to the STA3. The channel access procedure may be completed before the start time of the TS allocated to the STA3. In the instant case, PPDU transmission for the STA3 may start before the start time of the TS. Since a transmission period of the data frame (e.g. PPDU) includes the TS allocated to the STA3, the STA3 may obtain the data by performing a decoding operation on the PPDU received from the AP.

The AP may perform a channel access procedure to transmit a fourth data frame to the STA4 after transmitting the third data frame to the STA3 in the third TS. If the channel access procedure succeeds, the AP may transmit the fourth data frame to the STA4. The channel access procedure may be completed before the start time of the TS allocated to the STA4. In the instant case, PPDU transmission for the STA4 may start before the start time of the TS. In addition, the PPDU transmission for the STA4 may be completed before the start time of the TS. That is, a transmission period of the data frame (e.g. PPDU) may not include the TS allocated to the STA4. In the instant case, the AP may add padding to the data frame so that the transmission period of the data frame includes the TS allocated to the STA4. Since a transmission period of 'data frame+padding' includes the TS allocated to the STA4, the STA4 may obtain the data by performing a decoding operation on the PPDU received from the AP. As another method, if transmission of the fourth data frame ends before the TS allocated to the STA4, or there is a remaining duration in the rTWT SP1, the STA4 may perform uplink transmission in the TS allocated to the STA4. Alternatively, the STA1, STA2, STA3, and STA4 participating in the rTWT SP may transmit an uplink frame in the TS allocated to the STA4 through a channel access procedure. Alternatively, the AP may terminate the rTWT SP early.

Figure 6:
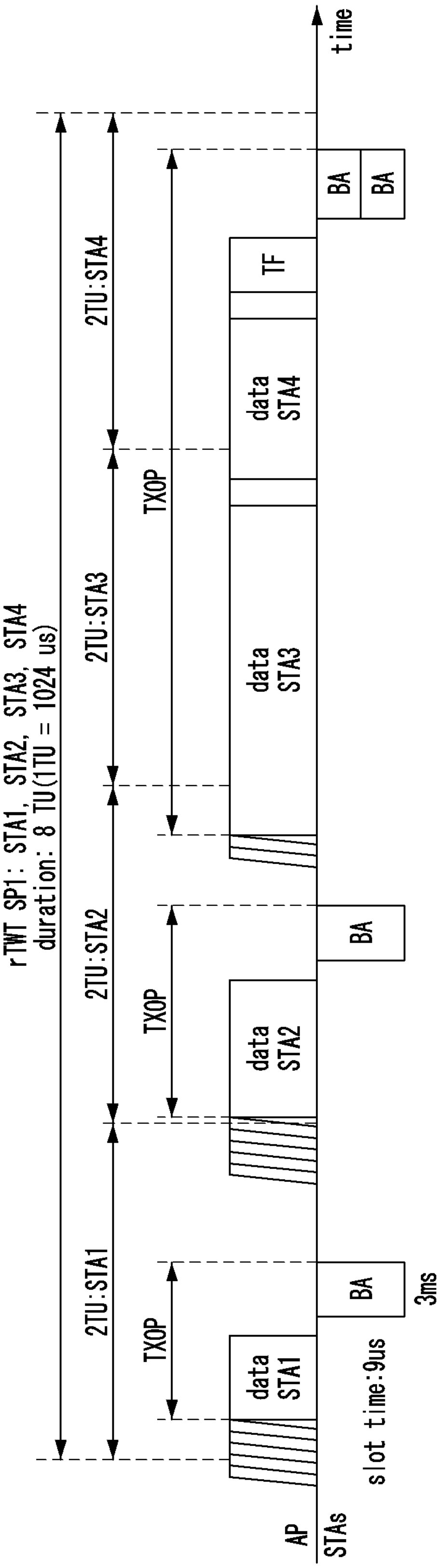
FIG. 6 is a timing diagram illustrating various exemplary embodiments of a communication method according to a slot-based rTWT.

FIG. 6 is a timing diagram illustrating a second exemplary embodiment of a communication method according to a slot-based rTWT.

As shown in FIG. 6, resources for a STA1, STA2, STA3, and STA4 may be allocated within a rTWT SP1. A duration of the rTWT SP1 may be 8 TUs (8192 us). A TS duration of 2 TUs (2048 us) may be set for each of the STA1, STA2, STA3, and STA4. A TS offset for the STA1 may be 0, a TS offset of the STA2 may be 2 TUs, a TS offset for the STA3 may be 4 TUs, and a TS offset for the STA4 may be 6 TUs. Accordingly, from a start time of the rTWT SP, TSs each having a length of 2 TUs may be sequentially allocated to the STA1, STA2, STA3, and STA4. Each TS of the STA1, STA2, STA3, and STA4 may be configured by a procedure of exchanging the TWT setup request frame and TWT setup response frame shown in FIG. 3.

Each STA may obtain data by performing a decoding operation on a PPDU in the TS allocated to itself. The AP may perform a channel access procedure, a channel sensing procedure, and a backoff procedure to transmit a data frame. A transmission procedure for the STA1 and STA2 in FIG. 6 may be the same as the transmission procedure for the STA1 and STA2 in FIG. 5 described above.

The AP may perform a channel access procedure to transmit a third data frame. The channel access procedure may succeed before the start time of the third TS. If the following condition(s) are satisfied, the AP may combine data frames for the STA3 and STA4 into an aggregated (A)-MPDU, and transmit a data frame in the A-MPDU form.

Condition 1: 'data frame for STA3+delimiter+data frame for STA4'≤a TXOP limit

Condition 2: 'data frame for STA3+delimiter+data frame for STA 4' can be transmitted in the TSs of the STA3 and STA4.

In the above-described exemplary embodiment of the present invention, the A-MPDU may be configured as 'MPDU for STA3+delimiter+MPDU for STA4+delimiter+ trigger frame (TF)'. The TF may allocate a resource for transmission of a block ACK (BA) frame for the MPDUs received at the STA3 and STA4. The BA frame may be a reception response frame. Since a transmission period (e.g. TXOP duration or PPDU length) of the A-MPDU includes the TSs allocated to the STA3 and STA4, each of the STA3 and STA4 may receive the A-MPDU, and may perform a decoding operation on the A-MPDU. If a receiver address (RA) included in a MAC header of the first MPDU included in the A-MPDU indicates the STA3, the STA3 may obtain the first MPDU. If an RA included in a MAC header of the second MPDU included in the A-MPDU indicates the STA4, the STA4 may obtain the second MPDU. Since an RA included in the TF is set as a broadcast address, the STA3 and STA4 may obtain channel allocation information for BA transmission by performing a decoding operation on the TF.

When the PPDU in the A-MPDU form is received, the STA4 may identify the TXOP duration or PPDU length based on a preamble of the PPDU. If the RA included in the MAC header of the first MPDU included in the PPDU of the A-MPDU form indicates its own address, multicast address including itself, or broadcast address including itself, the STA may perform a decoding operation on the first MPDU included in the corresponding PPDU. On the other hand, if the RA included in the MAC header of the first MPDU included in the PPDU of the A-MPDU form does not indicate its own address, the STA may set a NAV to not transmit during the TXOP duration indicated by the A-MPDU. However, in operations according to a slot-based rTWT, regardless of the recipient of the first MPDU included in the A-MPDU transmitted in the period including the TS allocated to the STA, the STA may perform a decoding operation on the A-MPDU without setting a NAV.

As another method, if the above-mentioned conditions (e.g. Condition 1 and Condition 2) are satisfied or if a duration of transmission of a downlink multi-user (DL MU) PPDU (e.g. HE MU PPDU, EHT MU PPDU) to the STA3 and STA4 is less than the TXOP limit or less than a sum of the TSs for the STA3 and STA4, the AP may configure and transmit data frames to be received by the STA3 and STA4 in form of a DL MU PPDU. The DL MU PPDU may be transmitted using an orthogonal frequency division multiple access (OFDMA) scheme. The DL MU PPDU configured by the AP may include MPDUs transmitted to the STA3 and STA4, and may further include a TF for resource allocation for a BA frame. The STA3 and STA4 receiving the AP's DL MU PPDU may decode the MPDU(s) included in the DL MU PPDU, and transmit a BA frame to the AP according to an uplink resource allocated by the TF.

Figure 7A:
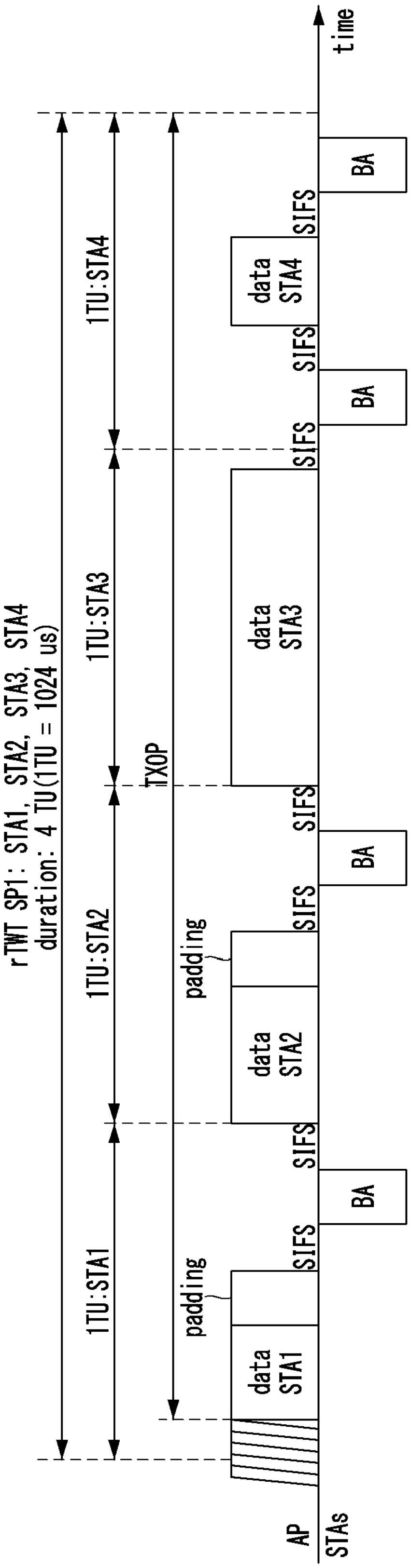
FIG. 7A is a timing diagram illustrating various exemplary embodiments of a communication method according to a slot-based rTWT.
Figure 7B:
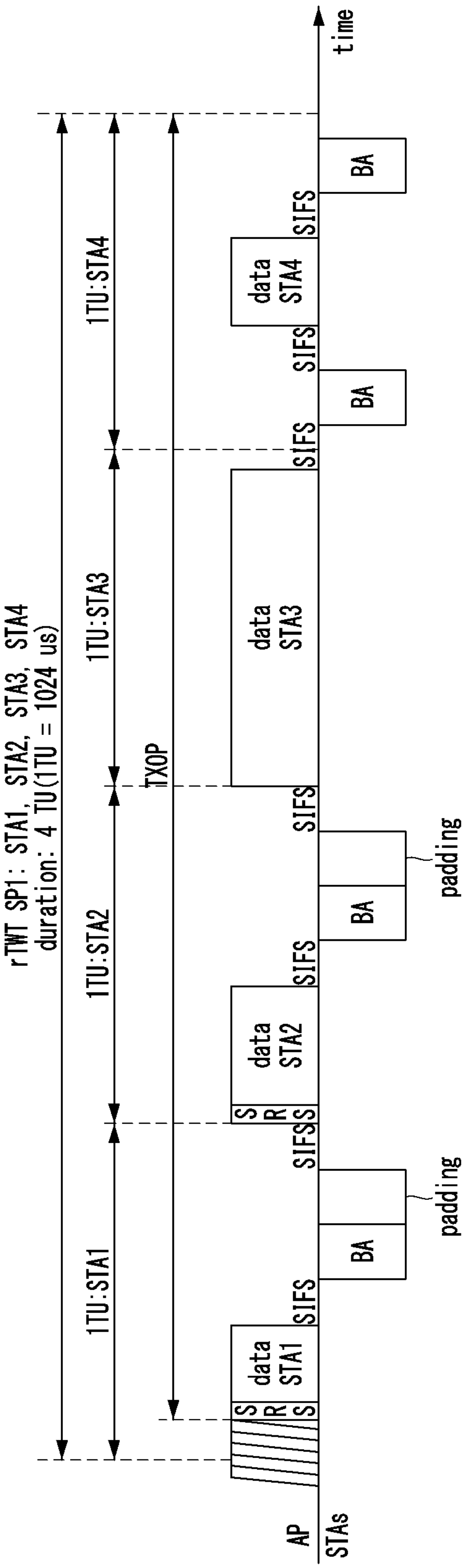
FIG. 7B is a timing diagram illustrating various exemplary embodiments of a communication method according to a slot-based rTWT.
Figure 7C:
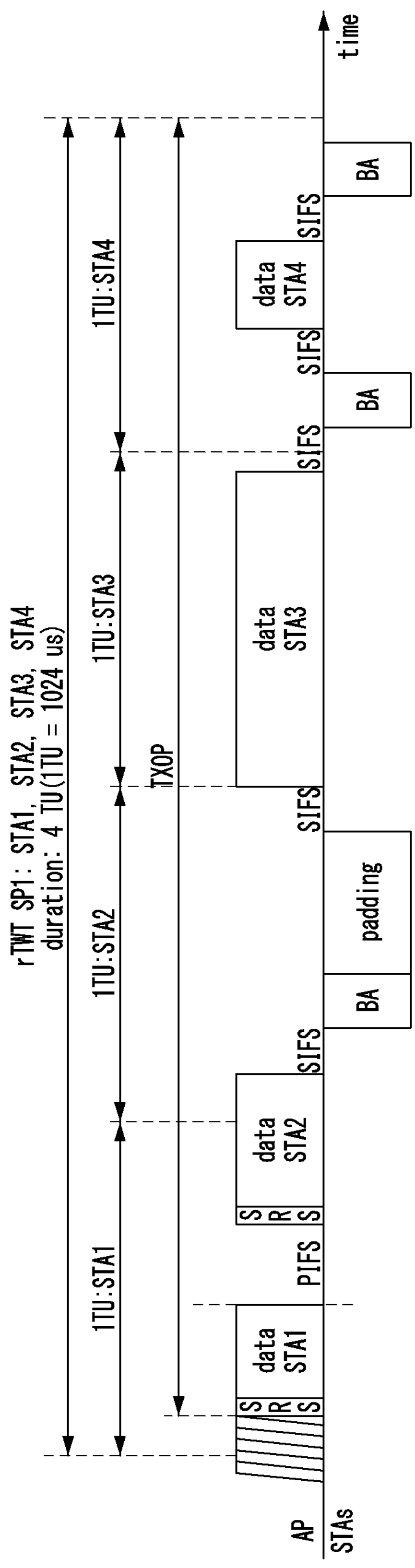
FIG. 7C is a timing diagram illustrating various exemplary embodiments of a communication method according to a slot-based rTWT.

FIG. 7A is a timing diagram illustrating a third exemplary embodiment of a communication method according to a slot-based rTWT, FIG. 7B is a timing diagram illustrating a fourth exemplary embodiment of a communication method according to a slot-based rTWT, and FIG. 7C is a timing diagram illustrating a fifth exemplary embodiment of a communication method according to a slot-based rTWT.

As shown in FIG. 7A, FIG. 7B, and FIG. 7C, resources for a STA1, STA2, STA3, and STA4 may be allocated within a rTWT SP1. A duration of the rTWT SP1 may be 4 TUs (4096 us). A TS duration of 1 TU (1024 us) may be set for each of the STA1, STA2, STA3, and STA4. A TS offset for the STA1 may be 0, a TS offset of the STA2 may be 1 TU, a TS offset for the STA3 may be 2 TUs, and a TS offset for the STA4 may be 3 TUs. Accordingly, from a start time of the rTWT SP, TSs each having a length of 1 TU may be sequentially allocated to the STA1, STA2, STA3, and STA4. Each TS of the STA1, STA2, STA3, and STA4 may be configured by a procedure of exchanging the TWT setup request frame and TWT setup response frame shown in FIG. 3.

The AP may perform a channel access procedure, a channel sensing procedure, and a backoff procedure to transmit a data frame. If the channel access procedure succeeds, the AP may set a TXOP duration to the maximum TXOP limit (e.g. 4 TUs) and transmit a first data frame to the STA1. The AP may receive a BA frame after a short interframe space (SIFS) from a time of transmitting the first data frame. In the instant case, the TXOP may be configured successfully, and the AP may transmit data frames at SIFS intervals within the TXOP. That is, within the TXOP, continuous transmission may be possible in a scheme of 'data frame+SIFS+BA frame+data frame+SIFS+BA frame'. ACs of data frames transmitted within the TXOP may be the same or different. In addition, recipients of the data frames transmitted within the TXOP may be the same or different. If a BA frame is not received after an SIFS from the time of transmitting the first data frame, configuration of the TXOP may fail. In the instant case, the AP may perform a backoff procedure (e.g. channel access procedure) again to transmit a second data frame.

In the exemplary embodiment of FIG. 7A, since the TXOP duration is 4 TUs, the TXOP may include TSs for all the STA1, STA2, STA3, and STA4. A transmission procedure of a data frame may start after the start time of the TS. If a length of a previous data frame is short, a transmission procedure of a next data frame may start before the start time of the TS. In the instant case, the AP may add padding to the previous data frame so that the transmission procedure of the next data frame starts after the start time of the TS. For example, if the length of the first data frame is short, the AP may transmit the first data frame with padding added. A time after a SIFS from a time of receiving the BA frame for the first data frame may be the start time of the TS of the STA2. Therefore, the AP may transmit a second data frame to the STA2. A length of a third data frame (i.e. the data frame for the STA3) may be long, in which case a BA frame for the third data frame may be received after the TS of the STA3. Alternatively, even if the BA frame for the third data frame is received within the TS of the STA3, a transmission procedure of a fourth data frame (i.e. data frame for the STA4) may start after the start time of the TS for the STA4. Even in the case described above, there is no problem if the transmission procedure of the fourth data frame starts within the TS of the STA4.

In the exemplary embodiment of FIG. 7B, padding may be added to a BA frame for a data frame to initiate a transmission procedure of the data frame at the start time of the TS. To support this operation, the AP may generate a header (e.g. MAC header) including information indicating to add padding to the BA frame (hereinafter referred to as 'padding indicator'), and transmit a data frame including the header. The padding indicator may be indicated through an SRS control subfield in an A-control. The SRS control subfield may indicate a PPDU response duration. The PPDU response duration may indicate a duration of a BA frame that is a response to the PPDU. The STA may add padding to the BA frame so that the duration of the BA frame corresponds to the PPDU response duration.

In the exemplary embodiment of FIG. 7C, if a BA frame is successfully received after a SIFS from a time of transmitting the first data frame, a TXOP may be configured. That is, if a procedure for exchanging the first data frame is successfully completed, the TXOP may be configured. In slot-based rTWT operations, a point coordination function (PCF) interframe space (PIFS) recovery procedure may be performed even without successful exchange of the first data frame. If a BA frame is not received within a PIFS from the time of transmitting the first data frame, the AP may retransmit the first data frame. If a retransmission period of the first data frame overlaps the second TS (i.e. TS for the STA2), the AP may not retransmit the first data frame. If the first data frame is not retransmitted, frame transmission may not be performed until the start time of the second TS. In the instant case, other communication nodes may take away the transmission opportunity. Therefore, the AP may transmit a QoS Null frame until the start time of the second TS, and transmit the second data frame to the STA2 at the start time of the second TS.

As another method, if a condition below is applied, the AP may transmit a second data frame to the STA2 after a PIFS from a time of transmitting the first data frame. In addition, the AP may add padding to the second data frame by considering a time of transmitting a third data frame. Alternatively, the AP may indicate the STA2 to add padding to a BA frame for the second data frame.

Condition: when a transmission procedure of the second data frame starts before the start time of the second TS, and a transmission period of the second data frame includes the second TS, the STA2 may receive the second data frame.

Figure 8:
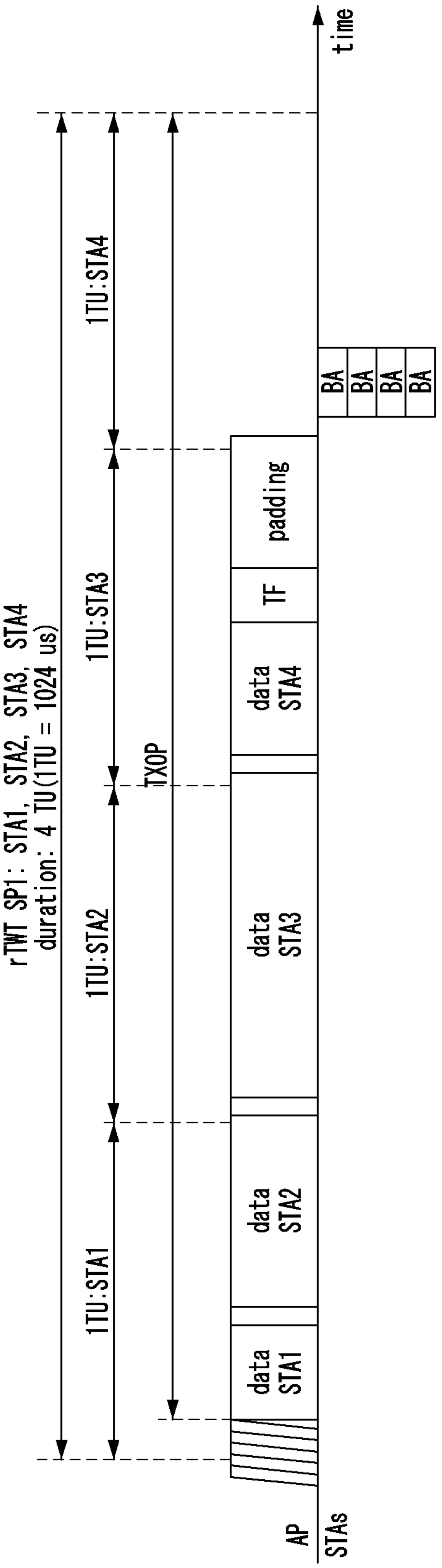
FIG. 8 is a timing diagram illustrating various exemplary embodiments of a communication method according to a slot-based rTWT.

FIG. 8 is a timing diagram illustrating a sixth exemplary embodiment of a communication method according to a slot-based rTWT.

As shown in FIG. 8, resources for a STA1, STA2, STA3, and STA4 may be allocated within a rTWT SP1. A duration of the rTWT SP1 may be 4 TUs (4096 us). A TS duration of 1 TU (1024 us) may be set for each of the STA1, STA2, STA3, and STA4. A TS offset for the STA1 may be 0, a TS offset of the STA2 may be 1 TU, a TS offset for the STA3 may be 2 TUs, and a TS offset for the STA4 may be 3 TUs. Accordingly, from a start time of the rTWT SP, TSs each having a length of 1 TU may be sequentially allocated to the STA1, STA2, STA3, and STA4. Each TS of the STA1, STA2, STA3, and STA4 may be configured by a procedure of exchanging the TWT setup request frame and TWT setup response frame shown in FIG. 3.

The AP may perform a channel access procedure, a channel sensing procedure, and a backoff procedure to transmit a data frame. If the channel access procedure succeeds, the AP may set a TXOP duration to the maximum TXOP limit (e.g. 4 TUs), and transmit a first data frame to the STA1. 4 TUs may be enough time to include TSs of all the STAs allocated with the rTWT SP. In the instant case, the AP may generate a PPDU in form of an A-MPDU including MPDUs of all the STAs and transmit the PPDU. To distinguish the MPDUs of the respective STAs within the PPDU, a delimiter may be inserted between the MPDUs. The STA may perform a decoding operation on all the MPDUs included in the A-MPDU when the TXOP duration of the A-MPDU includes its TS. The STA may obtain an MPDU in which itself is indicated as a recipient among the MPDUs. If the transmission period of the A-MPDU does not include TSs of all the STAs, the AP may add padding to the A-MPDU so that the transmission period of the A-MPDU includes TSs of all the STAs.

To ensure that all STAs receive the A-MPDU, the RA of each MPDU included in the A-MPDU may be set to a multicast address or group address indicating all STAs allocated within the rTWT SP1. In the instant case, all the STAs allocated within the rTWT SP1 may perform decoding operations on the A-MPDU regardless of whether the transmission period of the A-MPDU includes TSs therefor. Each STA may know the STA's allocation order within the rTWT SP1. Therefore, each STA may obtain its own MPDU from among the MPDUs included in the A-MPDU according to the STA's allocation order.

The RA of the MAC header of the MPDU may be set to a multicast address or group address, and the above-described A-MPDU may be included in a payload of the corresponding MPDU. If the RA of the data frame is set to a multicast address indicating all the STAs allocated within the rTWT SP1, each of all the STAs may receive the data frame, and may obtain its MPDU by additionally performing a decoding operation on the A-MPDU included in the payload of the data frame.

As another method, the AP may configure and transmit data frames to be received by the STA1, STA2, STA3, and STA4 in form of a DL MU PPDU (e.g. HE MU PPDU, EHT MU PPDU). The DL MU PPDU may be transmitted using the OFDMA scheme. The DL MU PPDU configured by the AP may include MPDUs transmitted to the STA3 and STA4, and may include a TF for allocating a resource for a BA frame. The STA1, STA2, STA3, and STA4 receiving the AP's DL MU PPDU may decode the MPDU(s) included in the DL MU PPDU, and transmit a BA frame to the AP according to the uplink resource allocated by the TF.

Figure 9A:
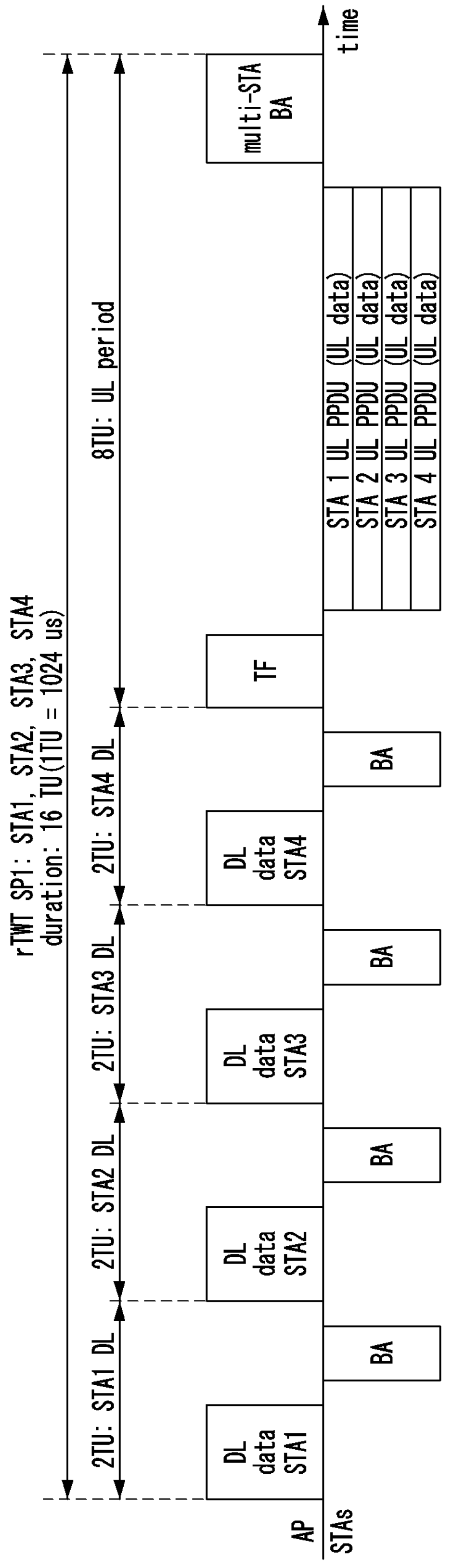
FIG. 9A is a timing diagram illustrating various exemplary embodiments of a communication method according to a slot-based rTWT.
Figure 9B:
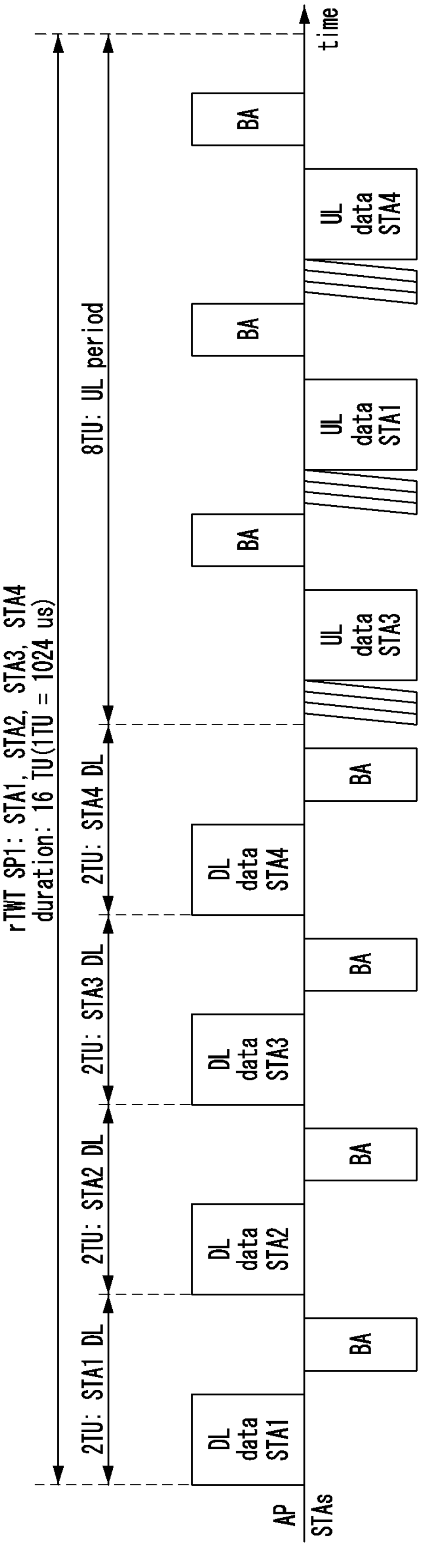
FIG. 9B is a timing diagram illustrating an various exemplary embodiments of a communication method according to a slot-based rTWT.

FIG. 9A is a timing diagram illustrating a seventh exemplary embodiment of a communication method according to a slot-based rTWT, and FIG. 9B is a timing diagram illustrating an eighth exemplary embodiment of a communication method according to a slot-based rTWT.

As shown in FIGS. 9A to 9B, resources for a STA1, STA2, STA3, and STA4 may be allocated within a rTWT SP1. A duration of the rTWT SP1 may be 16 TUs (16384 us). A TS duration of 2 TUs (2048 us) may be set for downlink transmission of each of the STA1, STA2, STA3, and STA4. A TS offset for the STA1 may be 0, a TS offset for the STA2 may be 2 TUs, a TS offset for the STA3 may be 4 TUs, and a TS offset for the STA4 may be 6 TUs. Accordingly, from a start time of the rTWT SP, TSs each having a length of 2 TUs may be sequentially allocated to the STA1, STA2, STA3, and STA4. That is, a total TS duration for all downlink transmissions of the STA1, STA2, STA3, and STA4 may be 8 TUs. Each TS of the STA1, STA2, STA3, and STA4 may be configured by a procedure of exchanging the TWT setup request frame and TWT setup response frame shown in FIG. 3.

Downlink operations of the STA1 to STA4 may be performed identically or similarly to the exemplary embodiments shown in FIGS. 5 to 8. The remaining 8 TUs of the total 16 TUs of the rTWT SP1 may be allocated for uplink transmissions of the STA1 to STA4.

As shown in FIG. 9A, 8 TUs not allocated to STA(s) within the rTWT SP1 may be referred to as a 'UL period'. In the UL period, the AP may transmit a TF for uplink resource allocation for the STA1 to STA4. The STA1 to STA4 may decode the TF of the AP and identify resource allocation information (e.g. sub-channel information, uplink resource time information) indicated by the AP. The STA1 to STA4 may transmit an uplink PPDU in the OFDMA scheme using the resource allocation information indicated by the TF after a SIFS from a time of receiving the TF. The AP may receive the UL PPDU (e.g. UL data) of the STA1 to STA4, and may transmit a multi-STA BA in response to the UL data.

As shown in FIG. 9B, 8 TUs not allocated to STA(s) within the rTWT SP1 may be referred to as a 'UL period'. In the UL period, the STA1 to STA4 may transmit uplink data through channel contention. For example, the STA1, STA3, and STA4 may transmit uplink data through channel contention and receive a BA frame in response to the uplink data from the AP. If there is no uplink data to transmit in the STA2, the STA2 may not perform transmission in the UL period.

Figure 10:
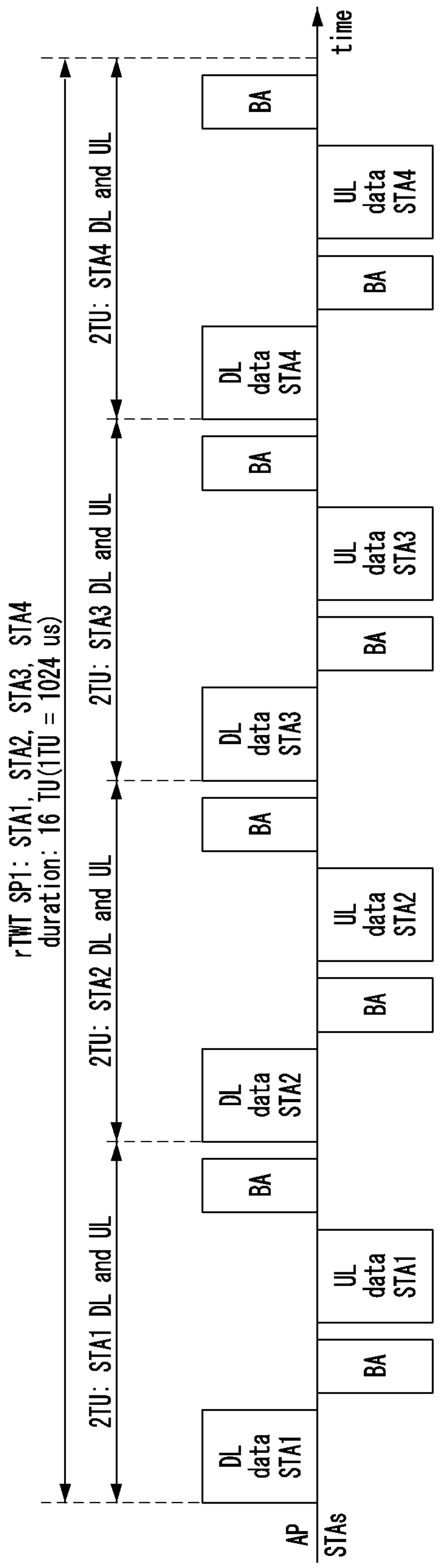
FIG. 10 is a timing diagram illustrating various exemplary embodiments of a communication method according to a slot-based rTWT.

FIG. 10 is a timing diagram illustrating a ninth exemplary embodiment of a communication method according to a slot-based rTWT.

As shown in FIG. 10, resources for a STA1, STA2, STA3, and STA4 may be allocated within a rTWT SP1. A duration of the rTWT SP1 may be 16 TUs (16384 us). A TS duration of 4 TUs (4096 us) may be set for downlink transmission of each of the STA1, STA2, STA3, and STA4. A TS offset for the STA1 may be 0, a TS offset for the STA2 may be 4 TUs, a TS offset for the STA3 may be 8 TUs, and a TS offset for the STA4 may be 12 TUs. Accordingly, from a start time of the rTWT SP, TSs each having a length of 4 TUs may be sequentially allocated to the STA1, STA2, STA3, and STA4. Each TS of the STA1, STA2, STA3, and STA4 may be configured by a procedure of exchanging the TWT setup request frame and TWT setup response frame shown in FIG. 3.

In the allocated TSs, the STA1 to STA4 may receive the AP's downlink data and transmit uplink data. For example, the AP1 may transmit downlink data to the STA1 in the first TS allocated for the STA1. The AP may use a reverse direction grant (RDG) to indicate a time resource available to the STA1 for uplink, and the STA1 may transmit uplink data to the AP1 using a reverse direction (RD) scheme based on information indicated by the RDG. Alternatively, the STA1 may transmit uplink data to the AP within the TS allocated to the STA1 by performing a separate channel access procedure after the downlink transmission of the AP is completed. The STA2 to STA4 may also perform downlink data reception operations and uplink data transmission operations using the same or similar method as the method of the STA1 described above.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of delivery of latency sensitive traffic to station (STA) by an access point (AP), the method comprising:

receiving, from a first STA by a processor, a target wake time (TWT) setup request frame;

transmitting, to the first STA by the processor, a TWT setup response frame in response to the TWT setup request frame for assigning a restricted target wake time (R-TWT) service period (SP) associated with both of the first STA and a second STA;

transmitting, to the first STA by the processor, first latency sensitive traffic through a first time slot (TS) within the R-TWT SP; and transmitting, to the second STA by the processor, second latency sensitive traffic through a second time slot (TS) within the R-TWT SP, wherein a setup for transmitting latency sensitive traffic within the R-TWT SP is individually performed to each of the first STA and the second STA.

2. The method of claim 1, wherein at least one of the TWT setup request frame or the TWT setup response frame includes offset information and duration information of the first TS, and the offset information indicates an offset from a start time of the R-TWT SP to a start time of the first TS.

3. The method of claim 2, wherein x bits in a nominal minimum TWT wake duration included in the TWT setup request frame or the TWT setup response frame indicate the offset information, y bits in the nominal minimum TWT wake duration indicate the duration information, and x and y are each natural numbers.

4. The method of claim 1, wherein each of the first latency sensitive traffic and the second latency sensitive traffic is transmitted after a channel access procedure succeeds.

5. The method of claim 1, wherein a transmission procedure of the second latency sensitive traffic starts after a time of (a transmission time of the first latency sensitive traffic+short interframe space (SIFS)+a reception time of a reception response frame+SIFS) elapses.

6. The method of claim 1, wherein padding is added to a first frame including the first latency sensitive traffic so that a transmission procedure of the second latency sensitive traffic starts after a start time of the second TS.

7. The method of claim 1, wherein a header of a first frame including the first latency sensitive traffic includes information indicating to add padding to a reception response frame for the first latency sensitive traffic.

8. A method of receiving latency sensitive traffic from an access point (AP) by a station (STA), the method comprising:

transmitting, to the AP by a processor, a target wake time (TWT) setup request frame;

receiving, from the AP by the processor, a TWT setup response frame from the AP in response to the TWT setup request frame for assigning a restricted target wake time (R-TWT) service period (SP) associated with a plurality of STAs including the STA; and receiving, from the AP by the processor, the latency sensitive traffic through a time slot (TS) within the R-TWT SP, wherein a setup for receiving latency sensitive traffic within the R-TWT SP by the STA is individually performed separately from a setup for receiving latency sensitive traffic within the R-TWT SP by another STA included in the plurality of STAs.

9. The method of claim 8, wherein at least one of the TWT setup request frame or the TWT setup response frame includes offset information and duration information of the TS, and the offset information indicates an offset from a start time of the R-TWT SP to a start time of the TS.

10. The method of claim 9, wherein x bits in a nominal minimum TWT wake duration included in the TWT setup request frame or the TWT setup response frame indicate the offset information, y bits in the nominal minimum TWT wake duration indicate the duration information, and x and y are each natural numbers.

11. The method of claim 8, wherein a header of a frame including the latency sensitive traffic includes information indicating to add padding to a reception response frame for the latency sensitive traffic.

12. An access point (AP) comprising:

at least one transceiver;

at least one processor; and at least one memory storing one or more instructions executable by the at least one processor, wherein the one or more instructions are executed by the at least one processor to perform:

receiving, from a first STA by a processor, a target wake time (TWT) setup request frame;

transmitting, to the first STA by the processor, a TWT setup response frame in response to the TWT setup request frame for assigning a restricted target wake time (R-TWT) service period (SP) associated with both of the first STA and a second STA;

transmitting, to the first STA, a first latency sensitive traffic through a first time slot (TS) within the R-TWT SP; and transmitting, to the second STA, second latency sensitive traffic through a second time slot (TS) within the R-TWT S, wherein a setup for transmitting latency sensitive traffic within the R-TWT SP is individually performed to each of the first STA and the second STA.

13. The AP of claim 12, wherein at least one of the TWT setup request frame or the TWT setup response frame includes offset information and duration information of the first TS, and the offset information indicates an offset from a start time of the R-TWT SP to a start time of the first TS.

14. The AP of claim 13, wherein x bits in a nominal minimum TWT wake duration included in the TWT setup request frame or the TWT setup response frame indicate the offset information, y bits in the nominal minimum TWT wake duration indicate the duration information, and x and y are each natural numbers.

15. The AP of claim 12, wherein each of the first latency sensitive traffic and the second latency sensitive traffic is transmitted after a channel access procedure succeeds.

16. The AP of claim 12, wherein a transmission procedure of the second latency sensitive traffic starts after a time of (a transmission time of the first latency sensitive traffic+short interframe space (SIFS)+a reception time of a reception response frame+SIFS) elapses.

17. The AP of claim 12, wherein padding is added to a first frame including the first latency sensitive traffic so that a transmission procedure of the second latency sensitive traffic starts after a start time of the second TS.

18. The AP of claim 12, wherein a header of a first data frame including the first latency sensitive traffic includes information indicating to add padding to a reception response frame for the first latency sensitive traffic.

* * * * *